United States Patent
Ishibashi et al.

(10) Patent No.: US 6,967,911 B1
(45) Date of Patent: Nov. 22, 2005

(54) MULTIVALUED INFORMATION RECORDING METHOD, MULTIVALUED INFORMATION RECORDING APPARATUS, AND RECORDING MEDIUM

(75) Inventors: Hiromichi Ishibashi, Ibaraki (JP); Kenichi Nishiuchi, Hirakata (JP); Takeo Ohta, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 706 days.

(21) Appl. No.: 09/612,797

(22) Filed: Jul. 10, 2000

(30) Foreign Application Priority Data

Jul. 12, 1999 (JP) .................................. 11-197036

(51) Int. Cl.[7] ............................................ G11B 7/0045
(52) U.S. Cl. ............................ 369/47.17; 369/53.31; 369/59.24
(58) Field of Search .................. 369/47.17, 47.51, 369/53.31, 59.11, 59.12, 59.24

(56) References Cited

U.S. PATENT DOCUMENTS

| | | | | |
|---|---|---|---|---|
| 5,153,872 A | * | 10/1992 | Maeda | 369/124.09 |
| 5,446,717 A | * | 8/1995 | Tomita | 369/53.31 |
| 5,615,193 A | * | 3/1997 | Kobayashi et al. | 369/59.25 |
| 5,790,492 A | * | 8/1998 | Umezawa et al. | 369/53.33 |
| 5,808,988 A | * | 9/1998 | Maeda et al. | 369/47.17 |
| 6,023,447 A | * | 2/2000 | Koboyashi | 369/59.12 |
| 6,188,656 B1 | * | 2/2001 | Shoji et al. | 369/47.25 |

FOREIGN PATENT DOCUMENTS

JP H6-309720 11/1994

* cited by examiner

*Primary Examiner*—Brian E. Miller
*Assistant Examiner*—Michael V. Battaglia
(74) *Attorney, Agent, or Firm*—RatnerPrestia

(57) ABSTRACT

A multivalued information recording method in which energy applied to information units on a recording medium is varied to record multivalued information. In accordance with a relationship between the multivalued information in a predetermined information unit and the multivalued information in information units adjacent to the predetermined information unit, the energy applied to the predetermined information unit is decided.

4 Claims, 4 Drawing Sheets

MULTIVALUED INFORMATION RECORDING METHOD, MULTIVALUED INFORMATION RECORDING APPARATUS, AND RECORDING MEDIUM

BACKGROUND OF THE INVENTION

1. Field of the Invention

The present invention relates to a multivalued information recording method and apparatus and a recording medium for recording multivalued information onto an optical recording medium whose characteristic varies according to applied energy.

2. Description of the Related Art

In recent years, optical disks have become of higher density. For optical disks capable of recording and reproduction of information such as CD-Rs and denser DVD-RAMs which are presently in common use, binary recording is generally used.

That is, laser power corresponding to one-bit digital information, namely "0" and "1", is applied onto the recording surface of the optical disk, the recording film formed on the recording surface, for example, a so-called phase-change film made of a GeTeSb compound is crystallized or made amorphous, and by the change in reflectance caused thereby, information is recorded.

In other words, binary, that is, one-bit information can be recorded in one information unit, that is, a partition unit on the medium (for example, the length on the recording surface corresponding to one clock) in recording information.

On the other hand, a multivalued information recording method has been proposed in recent years. For example, as shown in Japanese Laid-open Patent Application No. Hei 6-309720, laser power is switched among three or more values, and marks of sizes corresponding to the values are formed on the recording medium. For example, by forming marks of different sizes using laser power of four values corresponding to two-bit information "0(00)", "1(01)", "2(10)" and "3(11)", twice as much information per information unit can be recorded.

However, merely recording marks of sizes corresponding to the four values as described above sometimes causes reproduction errors because of interference between symbols when the marks are reproduced.

That is, in the case that the four-valued information is reproduced, for example, judgement for two-bit information "0", "1", "2" and "3" is based on the reproduction signal amplitude that varies according to the sizes of the mark. When the reproduction signal amplitude varies due to interference between symbols from the adjacent information marks, the information is wrongly judged as "3" where it should be judged as "2".

The problem of interference between symbols is not peculiar to the multivalued recording but yields also in the conventional binary recording. However, while the binary recording has a margin corresponding to the amplitude difference between reproduction signals caused by the presence or absence of the mark, the four-valued recording has a smaller margin corresponding only to a quarter of the amplitude difference, so that the problem of interference between symbols is more serious in the four-valued recording.

SUMMARY OF THE INVENTION

In view of the above-mentioned problem, an object of the present invention is to provide a multivalued information recording method, etc. capable of reducing reproduction errors by eliminating the influence of the interference between symbols. The present invention is a multivalued information recording method in which energy applied to information units on a recording medium is varied to record multivalued information, wherein in accordance with a relationship between multivalued information in a predetermined information unit and multivalued information in both of information units adjacent the predetermined information unit, the energy to be applied to the predetermined information unit is decided.

The present invention is multivalued information recording method in which by varying power of light applied to information units on a recording medium, widths of recorded marks are varied to thereby record multivalued information, wherein when the marks are recorded into the information units, an application time of the light is varied based on a relationship contradictory to the power of the light.

The present invention is a multivalued information recording apparatus in which energy applied to information units on a recording medium is varied to record multivalued information, comprising:

a register in which multivalued information to be recorded is stored;

decision means for deciding the energy to be applied to a predetermined information unit in accordance with a relationship between multivalued information in the predetermined information unit and multivalued information of both of information units adjacent the predetermined information unit; and an optical head for applying the decided applied energy to the recording medium.

The present invention is a recording medium having information units in which information is recorded in a multivalued manner by different energies being applied thereto, wherein a condition of a mark recorded in a predetermined information unit is adjusted in accordance with a relationship between multivalued information in the predetermined information unit and multivalued information in both of information units adjacent the predetermined information unit.

DESCRIPTION OF SYMBOLS

Figure 1:
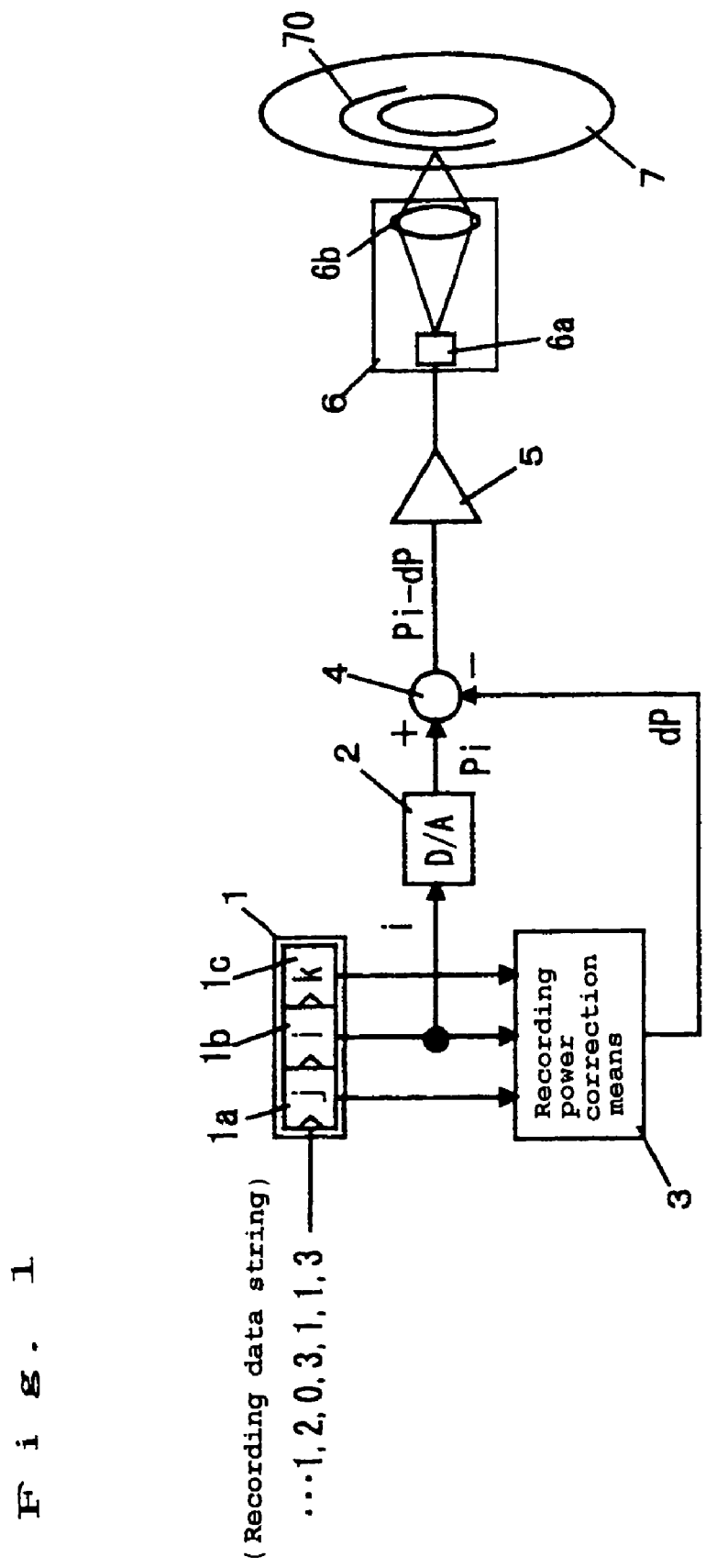
FIG. 1 is a block diagram of an apparatus for realizing a multivalued information recording method according to an embodiment of the present invention.

1 Shift register
2 D/A conversion means
3 Recording power correction means
5 Laser driver
6 Optical head
6a Laser light source
7 Optical disk
70 Track
8 Control means

DESCRIPTION OF THE PREFERRED EMBODIMENTS

Hereinafter, a multivalued information recording method according to an embodiment of the present invention will be described with reference to the drawings.

FIG. 1 is a block diagram of an apparatus for realizing the multivalued information recording method according to the embodiment of the present invention. Hereinafter, the method and the apparatus will be described.

In FIG. 1, first; a string of recording information having four values is supplied to a shift register 1. Of the registers constituting the shift register 1, in a register 1b, information i to be recorded is stored. In registers 1a and 1c, information j and information k to be recorded before and after the location where the information i is to be recorded are stored, respectively.

Reference numeral 2 represents D/A conversion means that outputs a signal Pi having an amplitude corresponding to a recording power pursuant to an information value i (=0, 1, 2 and 3). The signal Pi is supplied to a laser light source 6a of an optical head 6 through a laser driver 5, so that the laser light source 6a emits light with the power corresponding to the signal Pi.

Figure 2:
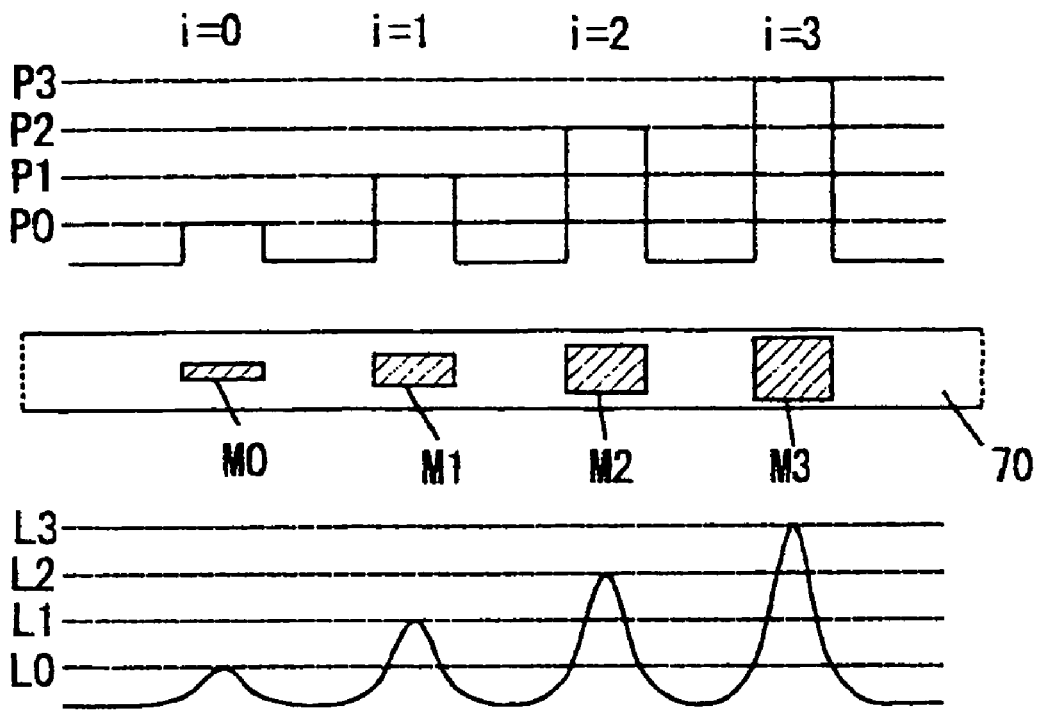
FIG. 2 is a view for explaining an operation in the embodiment.

That is, when a correction according to the present invention does not work, the laser light source 6a emits light with powers P0, P1, P2 and P3 corresponding to the information values i=0, 1, 2 and 3 as shown in FIG. 2. The laser light emitted by the laser light source 6a is focused by an objective lens 6b on an information track 70 formed on the recording surface of an optical disk 7.

On the recording surface of the optical disk 7, a phase-change film is formed, and marks M0, M1, M2 and M3 having widths (sizes) corresponding to the recording powers are formed along the information track 70.

When the marks thus recorded are reproduced, signals of amplitude levels L0, L1, L2 and L3 corresponding to the widths of the marks are obtained as shown in FIG. 2. By detecting the amplitudes of the reproduction signals, four-valued information, that is, two-bit information per information unit can be obtained.

However, as mentioned in Description of the Related Art, when the track recording density (the density in the direction of the tangential line of the track) per information unit is sufficiently low as shown in FIG. 2, since the marks are separated, the amplitudes of the marks can be independently detected. However, when the marks are formed close to one another in order to increase the track recording density, interference between symbols occurs.

Whether the interference between symbols is a problem or not depends on the diameter of the focused laser beam used for recording or reproduction. When the length of one information unit is substantially the same as or shorter than the diameter of the focused laser beam, it is better to consider that conspicuous interference between symbols occurs.

Figure 3:
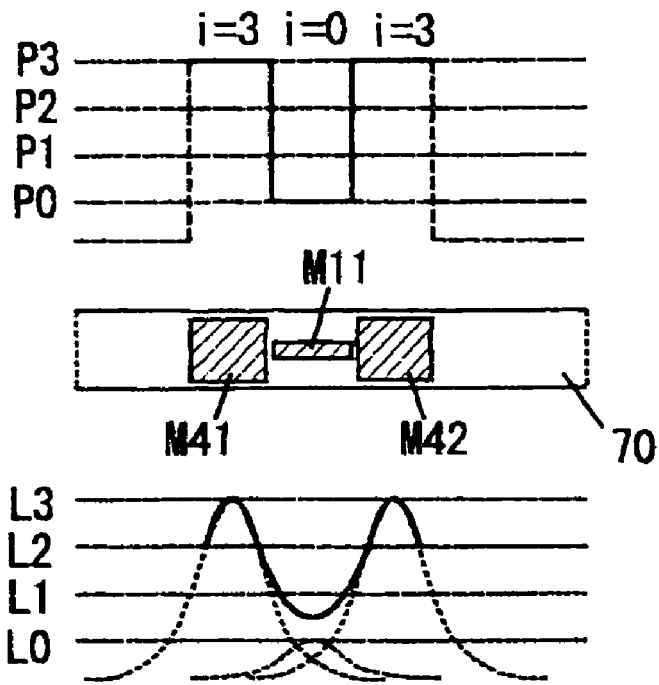
FIG. 3 is a view for explaining an operation in the embodiment.

Describing the problem of the conventional example in more detail, as an example, when a mark M11 formed with the lowest power P0 exists between marks M41 and M42 formed with the highest power P3 as shown in FIG. 3, as a consequence of being pulled up by the interference between symbols from the marks M41 and M42, the signal level when the mark M11 is reproduced gets higher than the level L0 which the signal level should be. Here, if an error in a direction that moreover increases the signal level occurs due to an influence of noise or the like, there will be cases where the mark M11 is wrongly judged as the level L1.

Therefore, in this embodiment, when a given mark is recorded, a correction is made in accordance with the recording amplitudes of the adjacent marks by use of recording power correction means 3.

Figure 4:
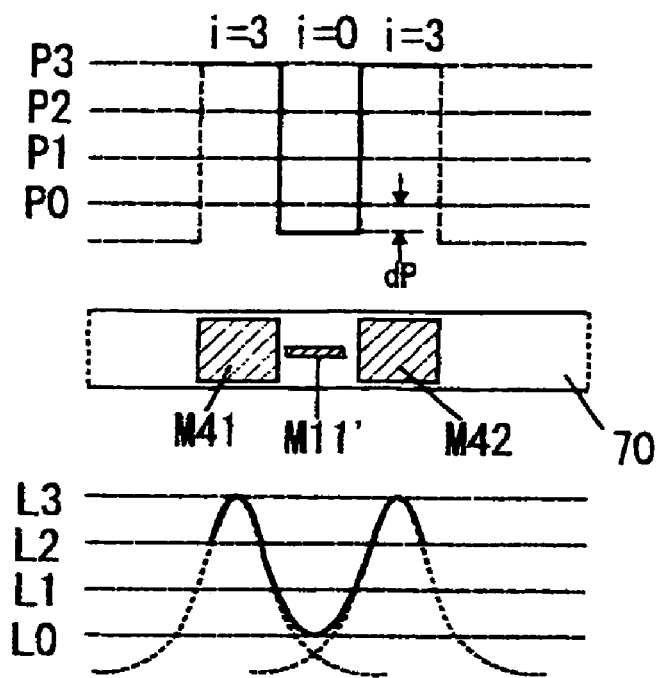
FIG. 4 is a view for explaining an operation in the embodiment.

This is shown in FIG. 4. That is, when the information values i=3, 0 and 3 are successively recorded, the information value i=0 is recorded with a power lower by dP than the power P0 by a subtracter 4.

Consequently, a mark M11' thinner than the mark M11 in FIG. 3 is recorded on the track 70.

Even if the mark M11 is reduced or disappears like that, the reproduction level when the mark M11' is reproduced is correctly detected because it is increased to the level L0 due to the interference between symbols from the marks M41 and M42.

As a concrete operation of the recording power correction means 3, for example, the following is considered: Let the average of the information j and the information k before and after the information i to be recorded be i', that is, $$i'=(j+k)/2 \quad \text{[Expression 1]}$$

and an amount proportional to the difference between the average value and the information i is used as the correction amount dP, that is, $$dP=c\times(i'-i) \quad \text{[Expression 2]}$$

The correction amount dP is supplied to the subtracter 4.

Here, c is a constant.

As a consequence of the recording power correction means 3 operating like the expressions (1) and (2), the larger the difference between the information value i to be recorded and the information values j and k of the adjacent marks is, the larger the generated correction amount dP is.

Since the level difference between the adjacent marks is in proportion to the exerted symbol interference, the effect of the correction by the expressions (1) and (2) acts in a direction that cancels the interference between symbols.

The above-described processing will be described in more detail. First, let a string of multivalued information i(1) to i(8) be PA i(1) i(2) i(3) i(4) i(5) i(6) i(7) i(8) PA 0 2 2 3 0 3 2 1 0 0

Here, PAs (=0) at the head and at the tail are so-called preamble and postamble. That is, to decide the amount of the recording power correction by the expressions (1) and (2), preceding and succeeding information values are necessary; however, since there is no information preceding the information i(1) at the head, PA=0 is added for the sake of convenience. This applied to the one at the tail. The added PAs are ignored at the time of reproduction.

When these are to be recorded by the conventional method, merely powers corresponding to the information values, for example, P0=4 mW
P1=5 mW
P2=6 mW
P3=7 mW are applied to the optical disk. Consequently, marks of widths corresponding to the applied powers are formed on the optical disk.

Next, concrete procedures of the correction according to the present invention will be described. First, the average values i(1' to i(8)' of the preceding and succeeding information values are obtained by the expression (1) are calculated as follows:

i(1) i(2)' i(3)' i(4)' i(5) i(6) i(7) i(8)
1.0 2.5 1.0 3.0 1.0 2.0 1.0 0.5

With c=0.2 [mW], the correction amounts dP1 to dP8 [mW] are obtained as follows by the expression (2):

dP(1) dP(2) dP(3) dP(4) dP(5) dP(6) dP(7) dP(8)
−0.2 0.1−0.4 0.6−0.4 0.0 0.0 0.1

The value of c differs according to the material of the recording film or the recording density. Therefore, by subtracting the correction amounts from a predetermined power, powers P(1) to P(8) [mW] to be applied when the information is recorded are decided as follows:

P(1) P(2) P(3) P(4) P(5) P(6) P(7) P(8)
6.2 5.9 7.4 3.4 7.4 6.0 5.0 3.9

In the above result, although i(4) and i(8) are both "0", the recording powers are 3.4 mW and 3.9 mW, respectively, which are different from each other. It is natural that such a result be obtained according to the sizes of the adjacent marks.

As described above, according to this embodiment, by making a correction in accordance with the recording amplitudes of the adjacent marks when a given mark is recorded a multivalued information recording method can be realized in which, errors due to interference between symbols do not yield or such errors can be significantly reduced at the time of signal reproduction.

The recording power correction means 3, the D/A conversion means 2 and the subtracter 4 are an example of the decision means of the present invention.

While power corresponding to the multivalued information to be recorded is generated by use of the D/A conversion means 2 in this embodiment, it is not necessary that the characteristic of the D/A conversion means 2 be linear with respect to input information. That is, the characteristic of the recording film formed on the optical disk 7 is frequently nonlinear with respect to the applied laser power, and there are cases where it is rather better to provide a characteristic that cancels the nonlinearity.

This embodiment is based on the premise that the size of the recording mark varies substantially linearly with respect to the recording power and consequently, has been described as if it were sufficient only to make the correction by the expression (2). In actuality, however, there are cases where power higher than the proportional relationship is necessary because of an influence of thermal diffusion or the like on the optical disk. For example, when the recording mark width (the information value to be recorded) and the power necessary for forming it are in a square relationship, it is necessary to decide the recording power correction amounts by the following relationship instead of the expression (2):

$$dP = c \times (i'^2 - i^2)$$ [Expression 3]

Needless to say, it is not necessary that the output of the D/A conversion means 2 when a mark of the information value i=0 is recorded be 0 (that is, no laser light emission). Rather, on the contrary, even though the information value i=0 of the lowest level is intended, it does not mean that absolutely no mark is formed but does mean that a certain amount of mark width (should be) recorded shown in FIG. 2. This is because as mentioned above, to eliminate the interference between symbols from the adjacent tracks. It is necessary to further reduce the recording power even for the information value i=0 of the lowest level. If recording is performed with the power 0 (or a power of a degree that no mark is formed) (that is, no mark is formed) at the beginning, it is impossible to further reduce the power to eliminate the interference between symbols.

While in this embodiment, the irradiated laser powers (P0 to P3) change in forming the marks corresponding to the multivalued information. In detail, the power (dP) changes for correcting the interference between symbols. However, since it is the energy decided by power×time that actually contributes to the formation of the marks on the recording film, the radiation time, for example, may be varied instead of the applied power.

While in this embodiment, as mentioned above, the recording time is fixed and the power of the laser light is variable in recording onto one information unit as shown in FIGS. 2 to 4, the recording length deviates even in a case where only the power is controlled and the radiation time is fixed. This is for the following reason: In actuality, the laser beam power distribution on the recording film is substantially circular and the central part forms the strongest Gaussian configuration. When the laser power is reduced in order to decrease the mark width, the mark length tends to also decrease, and when the laser power is raised in order to increase the mark width, the mark length tends to also increase. As a result, intended light energy is not reproduced.

Figure 5:
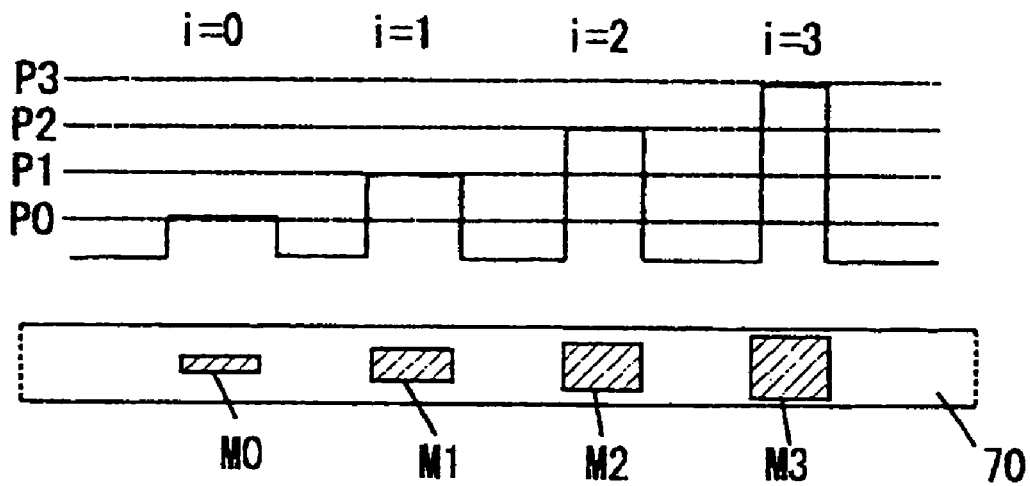
FIG. 5 is a view for explaining an operation in the embodiment.

Therefore, it is better to vary the radiation time as well as varying the power in accordance with the multivalued information as shown in FIG. 5.

That is, when a thin mark is recorded, the laser radiation time is long and when a thick mark is recorded, the application time is short, so that a mark of the same length can be formed in each information unit.

That is related also to the nonlinearity of the recording film and the necessity of its correction described previously. When the radiation time in forming a thick mark is merely reduced so that the mark lengths are the same, naturally the energy (power×time) applied to the recording film be reduced. When the irradiated energy is reduced, a mark of a width shorter than the expected width is formed. Therefore, in the above case, in order that the irradiated energies are constant, by radiating power higher than the proportional relationship, for example, as shown by the expression (3), marks of the widths corresponding to the information values can be correctly formed.

Figure 6:
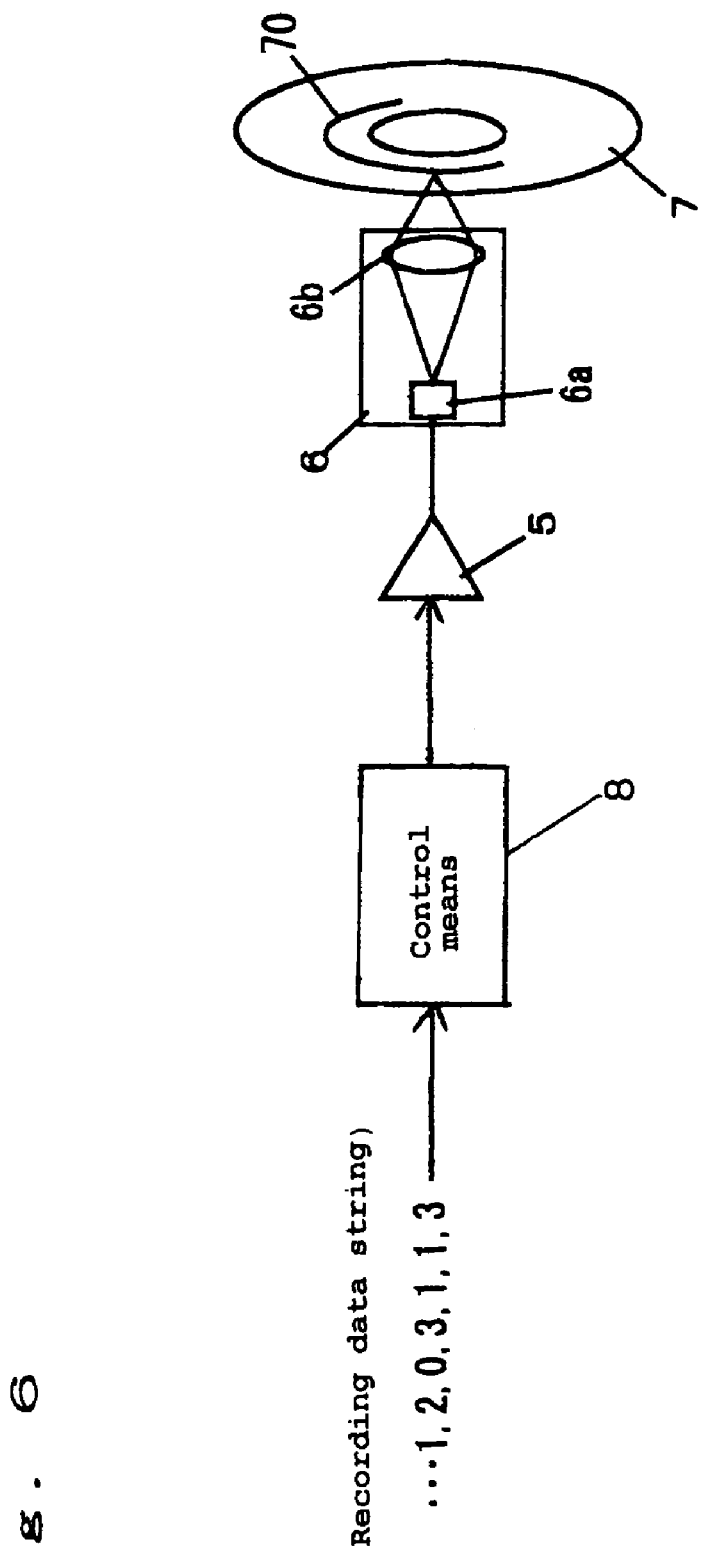
FIG. 6 is a view showing a multivalued information recording apparatus according to an embodiment of another aspect of the present invention.

FIG. 6 shows a circuit for realizing the embodiment of FIG. 5. Here, reference numeral 8 represents control means for varying the light radiation time based on a relationship contradictory to the light power in recording marks in information units.

While in the above-described embodiment, with respect to the relationship between the multivalued information in a predetermined information unit and the multivalued information values in both of the adjacent information units, the difference from the average is obtained with attention paid to the numerical values of the multivalued information itself, the present invention is not limited thereto; the present invention includes a case where the correction is made in accordance with a relationship between the energy to be irradiated to the information unit into which recording is to be performed and the energy to be irradiated to both of the adjacent information units. For example, with reference to the above-mentioned example, with respect to the information unit i (3), the energy to be irradiated thereto is 7 mW, the energies to be irradiated to the adjacent information units are 6 mW and 4 mW and the average thereof is 5 mW. Therefore, the correction amount corresponding to (7–5) mW is subtracted from 7 mW.

As described above, the present invention as claimed in claim 1 includes the embodiment paying attention to the applied energy.

Moreover, a recording medium of the present invention has information units in which information is recorded in a multivalued manner by different energies being applied thereto. In the recording medium, in accordance with the relationship between the multivalued information in the predetermined information unit and the multivalued information in both of the information units adjacent the predetermined information unit, the condition of the mark recorded in the predetermined information unit is adjusted.

As described above, according to the present invention, a multivalued information recording method can be realized in which interference between symbols scarcely occurs and a reproduction error is scarcely caused even when the density increases.

What is claimed is:

1. A method for recording a sequence of multivalued data on a recording medium, comprising the steps of:
   (a) receiving the sequence of multivalued data for consecutive recording on a single track of the recording medium;
   (b) representing the sequence received in step (a) by a sequence of power levels;
   (c) grouping the sequence of power levels in step (b) into groups, with each group having first, second and third consecutive power levels from the sequence of power levels;
   (d) averaging the first and third power levels to obtain an averaged power level;
   (e) modifying the second power level in each group by a derived value dependent on the averaged power level; and
   (f) recording on the single track the sequence of power levels of step (b) after being modified by step (e).

2. The method of claim 1 wherein step (e) includes the steps of:
   differencing the averaged power level and the second power level to obtain a difference; and
   multiplying the difference by a predetermined factor to obtain the derived value.

3. A method of reducing inter-symbol interference on multivalued data in a read process by adjusting the power of a write pulse in a multivalue write process, comprising the steps of:
   (a) storing temporarily multivalued data sequentially, wherein the multivalued data is a sequence of data for consecutive recording on a single track of a recording medium;
   (b) assigning a write laser power respectively to each multivalue;
   (c) modifying the write laser powers sequentially using multivalues of a preceding mark value and a following mark value; and
   (d) recording sequentially on the single track the modified write laser powers.

4. The method of claim 3, wherein step (c) includes determining a modification quantity by an average value of the preceding mark value and the following mark value to be stored.

* * * * *